United States Patent [19]
Waskiewicz

[11] Patent Number: 5,487,613
[45] Date of Patent: Jan. 30, 1996

[54] ADAPTOR FOR INNER BEARING RING BORE

[75] Inventor: Walter P. Waskiewicz, Bristol, Conn.

[73] Assignee: The Torrington Company, Torrington, Conn.

[21] Appl. No.: 432,447

[22] Filed: May 1, 1995

[51] Int. Cl.$^6$ .................................................... F16C 43/00
[52] U.S. Cl. .......................................... 384/539; 384/460
[58] Field of Search ................................. 384/460, 535, 384/537, 539, 585, 536

[56] References Cited

U.S. PATENT DOCUMENTS

| | | | |
|---|---|---|---|
| 2,608,451 | 8/1952 | Pierce, Jr. | 384/536 |
| 3,897,988 | 8/1975 | Dickinson et al. | 384/539 |
| 5,125,755 | 6/1992 | Adler et al. | 384/537 X |
| 5,178,472 | 1/1993 | Lawson | 384/460 X |

Primary Examiner—Thomas R. Hannon
Attorney, Agent, or Firm—John C. Bigler

[57] ABSTRACT

An adaptor for use with an inner bearing ring having a cylindrical bore. The adaptor comprises a tubular portion having a cylindrical outer surface adapted to be received within the inner bearing ring cylindrical bore and a non-cylindrical inner surface adapted to receive a non-cylindrical shaft. A plurality of foldable tabs are distributed along the circumference of the ends of the adaptor. The foldable tabs have a uniform thickness in the axial direction and are directed substantially radially outwardly from the cylindrical outer surface of the tubular portion and are angled axially inwardly. The tubular portion and foldable tabs are formed integrally of a resilient material such that the foldable tabs transiently fold to permit insertion of the adaptor into the bearing ring cylindrical bore and engage end surfaces of the bearing ring to retain the adaptor in the inner bearing ring after insertion.

22 Claims, 2 Drawing Sheets

ADAPTOR FOR INNER BEARING RING BORE

BACKGROUND OF THE INVENTION

This invention relates generally to rolling element bearings and, more particularly, to an adaptor for mounting an inner bearing ring with a cylindrical bore on a non-cylindrical shaft.

In agricultural implements, conveyors and similar applications, rolling element bearings with a hex bore may be utilized to simplify mounting of the bearings. Typically, the hex bore of an inner bearing ring of the bearings forms a slip fit over hex shafting such that the end-wise positioning of the bearings is provided by adjacent parts. In that manner, no collars, set screws or other locking device is required to lock the inner bearing ring to the shaft.

The inner bearing ring may be made of heat treated high carbon steel, and the hex bore must be formed accurately of that material and with a close tolerance to allow sliding on the hex shaft without excessive noise or pounding. Generally, broaching or other expensive machining of the inner bearing ring is required. Other problems may develop during use of the bearings if sliding of the inner bearing ring on the shaft is inhibited by corrosion, fretting or other causes.

The foregoing illustrates limitations known to exist in present rolling element bearings. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing an adaptor for use with an inner bearing ring having a cylindrical bore. The adaptor comprises a tubular portion having a cylindrical outer surface adapted to be received within the inner bearing ring cylindrical bore and a non-cylindrical inner surface adapted to receive a non-cylindrical shaft. Foldable tabs are distributed along the circumference of the ends of the adaptor. The foldable tabs have a uniform thickness in the axial direction and are directed substantially radially outwardly from the cylindrical outer surface of the tubular portion and are angled axially inwardly. The tubular portion and foldable tabs are formed integrally of a resilient material such that the foldable tabs transiently fold to permit insertion of the adaptor into the bearing ring cylindrical bore and engage end surfaces of the bearing ring to retain the adaptor in the inner bearing ring after insertion.

In another aspect of the present invention, this is accomplished by providing a rolling element bearing assembly including an adaptor received with an inner bearing ring cylindrical bore and providing a non-cylindrical inner surface.

The foregoing and other aspects will become apparent from the following detailed description of the invention when considered in conjunction with the accompanying drawing figures.

BRIEF DESCRIPTION OF THE DRAWING FIGURES

DETAILED DESCRIPTION

Figure 1:
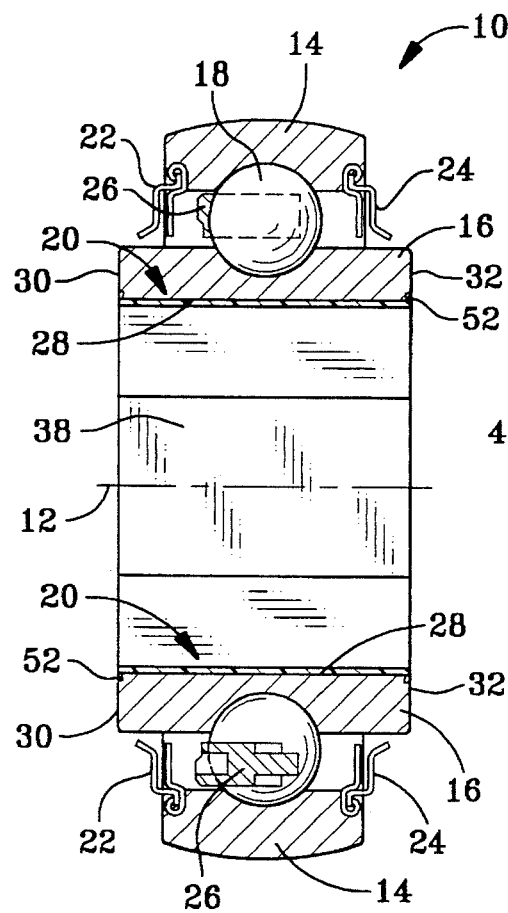
FIG. 1 is a cross-sectional view of a rolling element bearing illustrating a first embodiment of the adaptor for inner bearing ring bore of the present invention.

Referring now to the drawings, FIG. 1 illustrates rolling element bearing assembly 10 having axis 12, outer bearing ring 14, inner bearing ring 16, rolling elements 18, and adaptor 20 of the present invention. Optional bearing seals 22 and 24 and bearing retainer 26 are also illustrated, although they are not required for the practice of this invention. Inner bearing ring 16 has cylindrical bore 28 and first and second end surfaces 30 and 32, respectively.

Figure 2:
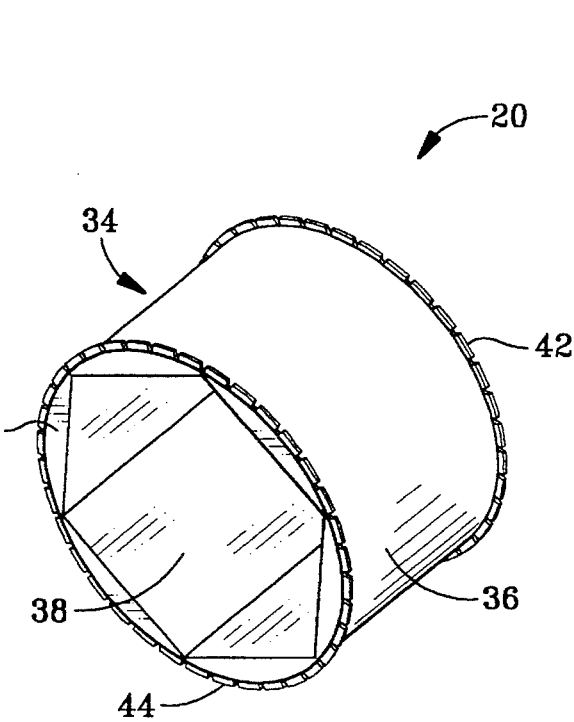
FIG. 2 is a pictorial view of the adaptor for inner bearing ring bore of FIG. 1.
Figure 3:
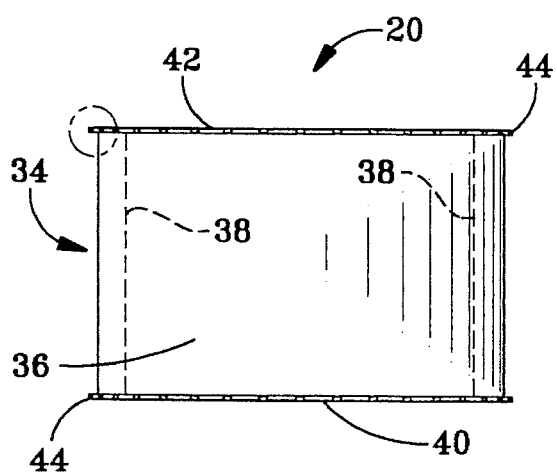
FIG. 3 is a top view of the adaptor for inner bearing ring bore of FIG. 1.

As shown more clearly in FIG. 2, adaptor 20 includes tubular portion 34 having cylindrical outer surface 36, sized to fit closely within inner bearing ring cylindrical bore 28, and non-cylindrical inner surface 38, configured to form a sliding fit with a non-cylindrical shaft, not shown, and provides first and second adaptor ends 40 and 42, respectively. In the embodiment of FIG. 1, for example, non-cylindrical inner surface 38 is hexagonal in cross-section to receive a hexagonal shaft.

Figure 4:
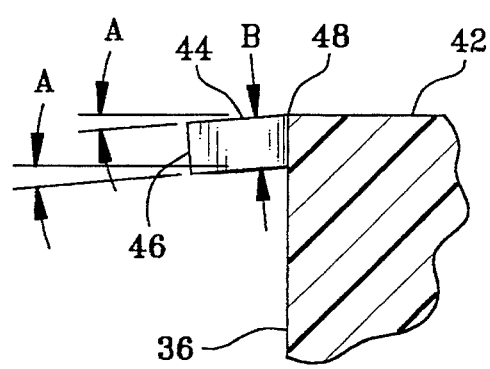
FIG. 4 is an enlarged detail view of a portion of the adaptor for inner bearing ring bore of FIG. 1, as indicated by the phantom line of FIG. 3, with portions cut away.

Foldable tabs 44 are distributed along the circumference of first and second adaptor ends 40 and 42. As shown in FIG. 4, foldable tabs 44 are directed substantially radially outwardly from cylindrical outer surface 36 of tubular portion 34 but are angled axially inwardly, slightly, by angle "A". Angle "A" may be 5 degrees, for example, making foldable tabs 44 form an 85 degree angle with cylindrical outer surface 36 (and with axis 12).

Because both axially opposite faces of foldable tabs 44 are directed at angle "A" from the radial direction, they have a thickness, indicated "B" in the axial direction that is uniform from cylindrical outer surface 36 out to tab tip 46, as shown in FIG. 4. Although other shapes may be used with similar effect, tab tip 46 may be perpendicular to the axially opposite faces of foldable tabs 44, as illustrated. Juncture 48, at the intersection of adaptor end 42 (or 40) and an end face of foldable tab 44 may be an annular ridge or a blended surface.

Figures 5, 6:
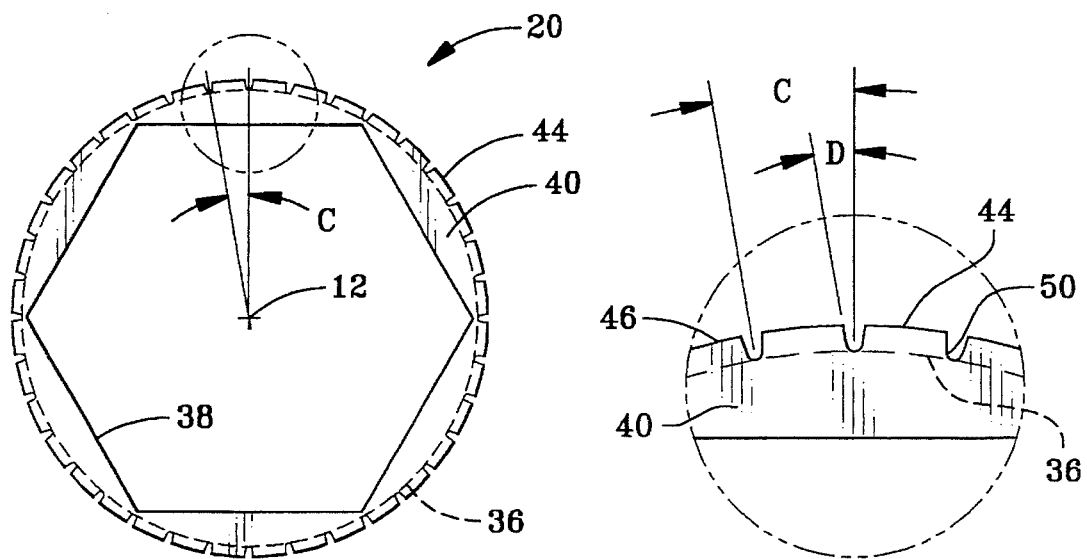
FIG. 5 is an end view of the adaptor for inner bearing ring bore of FIG. 1.
FIG. 6 is an enlarged detail view of a portion of the adaptor for inner bearing ring bore of FIG. 1, as indicated by the phantom line of FIG. 5.

The preferred number of foldable tabs 44 is dependent upon the size of inner bearing ring 16, fewer being required for smaller inner bearing rings. For an inner bearing ring of approximately 2 inches in diameter, for example, 36 foldable tabs may be used, forming a 10 degree included angle, indicated "C" in FIGS. 5 and 6. Preferably, grooves 50, separating foldable tabs 44, have a rounded bottom surface and diverging side surfaces defined by angle "D".

Adaptor 20 may be conveniently molded of a resilient material such that foldable tabs 44 transiently fold axially inwardly to when adaptor 20 is press-fit into bearing ring cylindrical bore 28. After insertion, foldable tabs 44 unfold to their initial configuration (or to a radially directed position) and engage inner bearing ring end surfaces 30 and 32 to retain adaptor 44 in inner bearing ring 16. Inner bearing end surfaces 30 and 32 may include annular groove 52 to recess foldable tabs 44 such that adaptor ends 40 and 42 are flush.

Several materials are suitable for forming adaptor 20 by molding or other means. Various polymers and elastomers are anticipated as preferred materials, such as, for example, a "toughened" polyamide known as Zytel ST801 available from DuPont Engineering Polymers of Wilmington, Del. These materials reduce noise and eliminate corrosion and fretting between the bearing assembly and the non-cylindrical shaft that might inhibit sliding of the bearing assembly along the non-cylindrical shaft.

Figures 7, 8:
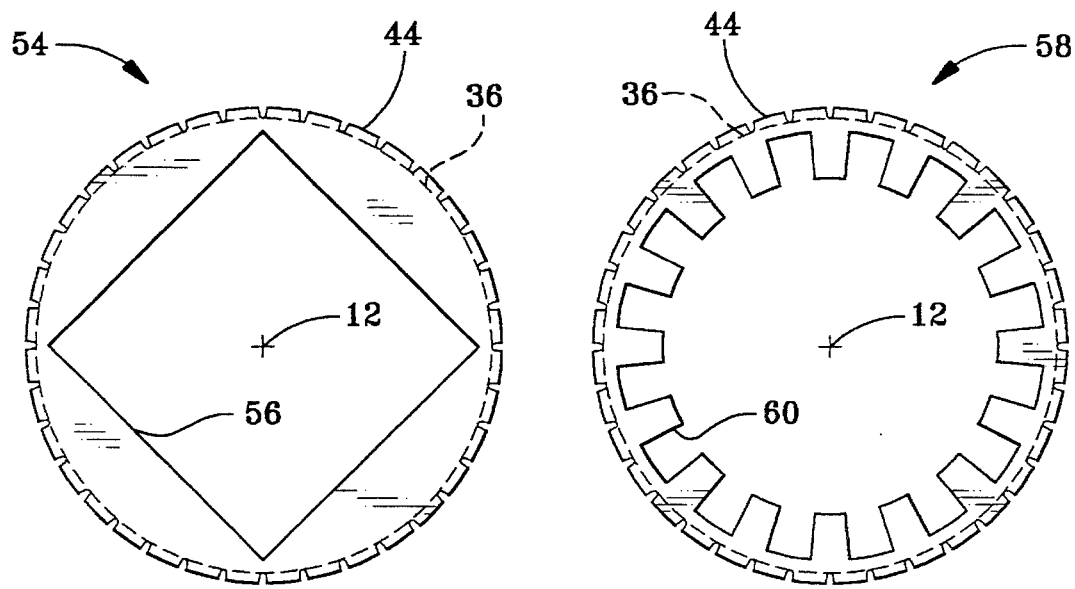
FIGS. 7 and 8 are end views of second and third embodiments, respectively, of the adaptor for inner bearing ring bore of the present invention.

As stated above, non-cylindrical inner surface 38 may have a wide range of configurations to provide a keyed relationship to a non-cylindrical shaft, over which the adaptor of the present invention is mounted. FIGS. 7 and 8 are end views illustrating adaptor 54 with square inner surface 56 for receiving a square shaft and adaptor 58 with splined inner surface 60 for receiving a splined shaft. These embodiments are merely illustrative and are not intended to be all-inclusive.

From the above description, it will be apparent that the present invention permits a rolling element bearing assembly to be fabricated economically with a hexagonal or other non-cylindrical bore for engagement with a hexagonal or other non-cylindrical shaft. Various interchangeable adaptors of the present invention may be inserted into a standardized inner bearing ring to accommodate a variety of shafts. The adaptor may be conveniently formed with close tolerances to avoid pounding and noise without broaching or other expensive machining.

Having described the invention, what is claimed is:

1. An adaptor for use with an inner bearing ring, the inner bearing ring having an axis, a cylindrical bore and first and second end surfaces, the adaptor comprising;
   a tubular portion having a cylindrical outer surface adapted to be received within the inner bearing ring cylindrical bore, a non-cylindrical inner surface adapted to receive a non-cylindrical shaft, and providing first and second adaptor ends; and
   a plurality of foldable tabs distributed along the circumference of the first and second adaptor ends, the foldable tabs being directed substantially radially outwardly from the cylindrical outer surface of the tubular portion and angled axially inwardly;
   the tubular portion and foldable tabs being formed integrally of a resilient material such that the foldable tabs may transiently fold to permit insertion of the adaptor into the bearing ring cylindrical bore and engage the first and second bearing ring end surfaces to retain the adaptor in the inner bearing ring after insertion.

2. The adaptor for use with an inner bearing ring according to claim 1, wherein the resilient material forming the tubular portion and foldable tabs is a polyamide.

3. The adaptor for use with an inner bearing ring according to claim 1, wherein the non-cylindrical inner surface of the tubular portion is substantially hexagonal in cross-section to receive a hexagonal shaft.

4. The adaptor for use with an inner bearing ring according to claim 1, wherein the non-cylindrical inner surface of the tubular portion is substantially square in cross-section to receive a square shaft.

5. The adaptor for use with an inner bearing ring according to claim 1, wherein the non-cylindrical inner surface of the tubular portion is splined to receive a splined shaft.

6. The adaptor for use with an inner bearing ring according to claim 1, wherein the foldable tabs form an angle with respect to the bearing ring axis of between 80 and 88 degrees.

7. The adaptor for use with an inner bearing ring according to claim 1, wherein the number foldable tabs is between 10 an 40, a greater number of foldable tabs being used when the inner bearing ring is of a larger size.

8. The adaptor for use with an inner bearing ring according to claim 1, wherein the foldable tabs are elongated in a circumferential direction and have diverging side surfaces at circumferential ends.

9. The adaptor for use with an inner bearing ring according to claim 1, wherein the resilient material forming the tubular portion and foldable tabs is an elastomer.

10. A rolling element bearing assembly having an axis and comprising:
    an inner bearing ring having a cylindrical bore and first and second end surfaces;
    an outer bearing ring;
    rolling elements between the inner and outer bearing rings; and
    an adaptor formed of a resilient material and having a tubular portion with a cylindrical outer surface within the inner bearing ring bore, a non-cylindrical inner surface engageable with a non-cylindrical shaft, and a plurality of foldable tabs distributed along the circumference of each end of the adaptor;
    the foldable tabs of the adaptor being directed substantially radially outwardly from the cylindrical outer surface of the tubular portion and along the first and second end surfaces of the inner bearing ring.

11. The adaptor for use with an inner bearing ring according to claim 1, wherein the foldable tabs having a uniform thickness in the axial direction.

12. The rolling element bearing assembly according to claim 10, wherein at least one of the first and second bearing ring end surfaces includes an annular groove and the foldable tabs extend into the annular groove.

13. The rolling element bearing assembly according to claim 10, wherein the foldable tabs are directed radially with respect to the axis.

14. The rolling element bearing assembly according to claim 10, wherein the foldable tabs are directed axially inwardly at an angle with respect to the axis of between 80 and 88 degrees.

15. The rolling element bearing assembly according to claim 10, wherein the resilient material forming the tubular portion and foldable tabs is a polyamide.

16. The rolling element bearing assembly according to claim 10, wherein the non-cylindrical inner surface of the tubular portion is substantially hexagonal in cross-section to receive a hexagonal shaft.

17. The rolling element bearing assembly according to claim 10, wherein the non-cylindrical inner surface of the tubular portion is substantially square in cross-section to receive a square shaft.

18. The rolling element bearing assembly according to claim 10, wherein the non-cylindrical inner surface of the tubular portion is splined to receive a splined shaft.

19. The rolling element bearing assembly according to claim 11, wherein the number foldable tabs is between 10 an 40, a greater number of foldable tabs being used when the inner bearing ring is of a larger size.

20. The rolling element bearing assembly according to claim 10, wherein the foldable tabs are elongated in a circumferential direction and have diverging side surfaces at circumferential ends.

21. The rolling element bearing assembly according to claim 10, wherein the resilient material forming the tubular portion and foldable tabs is an elastomer.

22. The rolling element bearing assembly according to claim 10, wherein the foldable tabs of the adaptor have a uniform thickness in the axial direction.

* * * * *